United States Patent
Rockenfeller et al.

(10) Patent No.: US 9,239,174 B2
(45) Date of Patent: Jan. 19, 2016

(54) CASCADE FLOATING INTERMEDIATE TEMPERATURE HEAT PUMP SYSTEM

(75) Inventors: Uwe Rockenfeller, Boulder City, NV (US); Paul Sarkisian, Boulder City, NV (US); Kaveh Khalili, Boulder City, NV (US)

(73) Assignee: ROCKY RESEARCH, Boulder City, NV (US)

( * ) Notice: Subject to any disclaimer, the term of this patent is extended or adjusted under 35 U.S.C. 154(b) by 479 days.

(21) Appl. No.: 13/030,066

(22) Filed: Feb. 17, 2011

(65) Prior Publication Data

US 2012/0210736 A1 Aug. 23, 2012

(51) Int. Cl.
*F25B 7/00* (2006.01)
*F25B 49/00* (2006.01)
*F25B 49/02* (2006.01)

(52) U.S. Cl.
CPC . *F25B 7/00* (2013.01); *F25B 49/02* (2013.01); *F25B 2600/025* (2013.01); *F25B 2600/111* (2013.01); *F25B 2600/112* (2013.01); *F25B 2700/21151* (2013.01); *F25B 2700/21152* (2013.01); *F25B 2700/21161* (2013.01); *F25B 2700/21171* (2013.01); *Y02B 30/743* (2013.01)

(58) Field of Classification Search
CPC ............ F25B 7/00; F25B 25/005; F25B 5/02; F25B 2400/06; F25B 13/00; F25B 29/003; F25B 49/022; F25B 49/025; F25B 49/027; F25B 2400/075; F25B 2600/0253; F25B 2600/111; F25B 2600/112; F25D 11/025

USPC .......... 62/79, 113, 175, 180, 186, 222, 228.1, 62/228.3–228.5, 335, 513
See application file for complete search history.

(56) References Cited

U.S. PATENT DOCUMENTS

| | | | |
|---|---|---|---|
| 4,916,913 A * | 4/1990 | Narikiyo | 62/81 |
| 5,241,829 A * | 9/1993 | Irie | F25B 30/02 62/204 |
| 5,335,508 A * | 8/1994 | Tippmann | 62/129 |
| 5,392,612 A | 2/1995 | Alsenz | |
| 5,675,982 A | 10/1997 | Kirol et al. | |
| 6,112,535 A * | 9/2000 | Hollenbeck | 62/228.4 |
| 6,405,554 B1 * | 6/2002 | Kawakatu et al. | 62/335 |
| 6,986,262 B2 * | 1/2006 | Takasugi | F25B 7/00 62/292 |
| 7,266,959 B2 | 9/2007 | Lewis | |
| 7,293,421 B2 | 11/2007 | Michalski et al. | |

(Continued)

FOREIGN PATENT DOCUMENTS

| | | |
|---|---|---|
| GB | 2 374 921 A | 10/2002 |
| JP | 2-192546 | 7/1990 |

(Continued)

OTHER PUBLICATIONS

International Search Report and Written Opinion in PCT/US12/25290 mailed on May 25, 2012 in 21 pages.

*Primary Examiner* — Mohammad M Ali
*Assistant Examiner* — Meraj A Shaikh
(74) *Attorney, Agent, or Firm* — Knobbe, Martens, Olson & Bear LLP

(57) ABSTRACT

A cascade heat pump system is configured with variable-speed compressors which allow operation at a high system coefficient of performance for a given thermal load. An electronic control module may be utilized to dynamically vary the speed of the compressors to achieve maximum energy efficiency. Variable-speed fans or blowers may also be used.

27 Claims, 3 Drawing Sheets

(56) References Cited

U.S. PATENT DOCUMENTS

| | | | |
|---|---|---|---|
| 7,716,943 B2 | 5/2010 | Seefeldt | |
| 8,011,191 B2 * | 9/2011 | Wang | F25B 7/00 62/510 |
| 2007/0056312 A1 * | 3/2007 | Kobayashi | F25B 7/00 62/335 |
| 2007/0062207 A1 * | 3/2007 | Aiyama et al. | 62/222 |
| 2008/0155993 A1 * | 7/2008 | Kuehl | 62/3.6 |
| 2008/0307813 A1 * | 12/2008 | Lifson et al. | 62/228.4 |
| 2009/0260389 A1 | 10/2009 | Dube | |
| 2009/0277197 A1 | 11/2009 | Gambiana et al. | |
| 2010/0077788 A1 | 4/2010 | Lewis | |
| 2011/0314848 A1 | 12/2011 | Tanaka et al. | |

FOREIGN PATENT DOCUMENTS

| | | |
|---|---|---|
| JP | 2007-522383 | 8/2007 |
| JP | 2009-270773 | 11/2009 |
| JP | 2010-236817 | 10/2010 |
| JP | 2010-286234 | 12/2010 |
| WO | WO 2005/083247 | 9/2005 |

* cited by examiner

CASCADE FLOATING INTERMEDIATE TEMPERATURE HEAT PUMP SYSTEM

BACKGROUND

Heat pumps are often employed to provide heating or cooling to a target space or zone, often the indoor area of a residential or commercial building. The most common type of heat pump is the air-source heat pump, which transfers and amplifies heat between a target space and the air in another space, often an ambient environment. For heating, ventilation, and air conditioning/refrigeration (HVAC/R) applications, heat pumps often utilize the vapor-compression refrigeration cycle, in which a circulating refrigerant is used as the medium which absorbs heat from one space and subsequently rejects the heat elsewhere.

In a single-stage vapor-compression heat pump system, the refrigerant flows through an evaporator which absorbs heat and produces a vapor and then to a compressor that provides the necessary pressure increase before entering a condenser to reject the heat. The refrigeration is then expanded to a low pressure using an expansion device such as a thermal expansion device (TXV) before returning to the evaporator. Fans or blowers are also often used to transfer the heating or cooling effect to the target space or ambient environment. Single-stage vapor-compression systems are not practical for cold-climate heating applications due to the low suction pressure of the refrigerant at low ambient temperature and the difficulty of efficiently operating compressors at high compression ratios and compressing refrigerants with large specific volume.

One known cold-climate heating solution is a multi-stage cascade heat pump system, in which multiple separate vapor-compression cycles are coupled to each other with the evaporator of the higher-stage cycle removing the heat of the condensing refrigerant of the immediately lower stage cycle. Each cycle in a multi-stage cascade system usually uses a different refrigerant suitable for that temperature, with the refrigerant selected to be best suited for its operating conditions. Multi-stage cascade heat pump systems have the advantages of a lower evaporating temperature, smaller compression ratio and higher compressor volumetric efficiency when compared with single-stage systems.

Two-stage cascade systems have been used in HVAC/R for many decades. However, these traditional two-stage cascade systems suffer from inherent inefficiencies that result from the overlap of the condensing temperature in the lower stage and the evaporating temperature in the upper stage. This shortcoming can be partially avoided by introduction of a liquid-vapor heat exchanger and desuperheaters. However, there exists a continuing need to develop cascade heat pump systems with increased energy efficiency.

SUMMARY OF THE INVENTION

Described herein are embodiments of a heat pump system comprising a first stage having a first compressor, a first condenser, a first expansion valve and a first evaporator. The system also has a second stage having a second compressor, a second condenser, a second expansion valve, and a second evaporator. The first condenser and second evaporator are positioned to pump heat from the first condenser to the second evaporator. At least either the first compressor or second compressor is a variable-speed compressor. The system also comprises an electronic control module configured to control the speed of at least the first compressor or second compressor. In is understood by those skilled in the art that multiple condensers may be used to deliver heat to multiple air-handlers. While one embodiment of the invention uses two variable-speed compressors in each stage, it is understood by those skilled in the art that some of the benefits can also be attained by use of one variable-speed compressor and one fixed-speed compressor. In some embodiments, either the first compressor or second compressor is a fixed-speed compressor. In some embodiments, both the first compressor and second compressor are variable-speed compressors. In some embodiments, the first compressor, second compressor, or both are powered by variable-frequency drives. In some embodiments, the first compressor, second compressor, or both are powered by electronically commutated motors. In some embodiments, the first expansion valve, second expansion valve, or both are pulsing thermal expansion valves. In some embodiments, the heat pump system further comprises at least one variable-speed fan or blower. In some embodiments, the heat pump system further comprises a plurality of temperature sensors configured to send temperature data to the electronic control module. In some embodiments, the heat pump system further comprises a pressure sensor configured to send suction pressure data from the first stage to the electronic control module. In some embodiments, the heat pump system further comprises a first refrigerant in the first stage and a second refrigerant in the second stage. In some embodiments, the first refrigerant is different from the second refrigerant. In some embodiments, the heat pump system further comprises a third stage having a third compressor, a third condenser, a third expansion valve and a third evaporator and configured to pump heat from the second condenser to the third evaporator.

Also described herein are embodiments of methods of controlling a cascade heat pump system comprising providing a first heat pump stage having a first compressor, a first condenser and a first evaporator; providing a second heat pump stage having a second compressor, a second condenser and a second evaporator, wherein the first evaporator and second condenser are positioned to pump heat from the first condenser to the second evaporator, and wherein at least either the first or second compressor is a variable-speed compressor; and, controlling the speed of at least either the first or second compressor to maximize a coefficient of performance of the system at a predetermined thermal load. In some embodiments, either the first compressor or second compressor is a fixed-speed compressor. In some embodiments, both the first compressor and second compressor are variable-speed compressors. In some embodiments, controlling the speed comprises receiving data from at least one sensor. In some embodiments, the sensor is a pressure or temperature sensor. In some embodiments, the speed of at least either the first or second compressor is controlled by controlling power to a variable frequency drive. In some embodiments, the speed of at least either the first or second compressor is controlled by controlling power to an electronically commutated motor. In some embodiments, the method of controlling a cascade heat pump system further comprises controlling the speed of a fan configured to blow air over the first evaporator. In some embodiments, the method of controlling a cascade heat pump system further comprises controlling the speed of a fan configured to blow air over the second evaporator. In some embodiments, the method of controlling a cascade heat pump system further comprises providing a pulsing thermal expansion valve between the first condenser and the first evaporator. In some embodiments, the method of controlling a cascade heat pump system further comprises providing a pulsing thermal expansion valve between the second condenser and the second evaporator.

DETAILED DESCRIPTION

To increase the efficiency of a cascade heat pump system, the compressors and fans or blowers may be operated at independently variable speeds. As a result, the intermediate temperature between the stages, and thus the temperature lift in each cycle, can be continuously adjusted to result in maximized overall efficiency.

Variable-speed control allows a cascade heat pump system to maintain both a high capacity and coefficient of performance (COP) for either heating or cooling applications. As used herein, capacity refers to the rate at which a heat pump is able to release heat into, or reject heat from, a target space. COP is an indication of the energy efficiency of a heat pump. For heating, COP of a cascade heat pump system is defined as the ratio of the amount of heat pumped (i.e., transferred) by the system to the target space to the amount of work inputted into the system:

$$COP_{heating} = \frac{Q_H}{\sum W_i}$$

where $Q_H$ is the system heating capacity (heat transferred across the condenser to the target space), and $\sum W_i$ represents the sum of the work input into the system. For air conditioning/refrigeration, COP is defined as the ratio of heat transferred by the system from the target space to the amount of work inputted into the system:

$$COP_{cooling} = \frac{Q_C}{\sum W_i}$$

where $Q_C$ is the system cooling capacity (heat transferred across the evaporator from the target space), and $\sum W_i$ represents the sum of the work input into the system.

Figure 1:
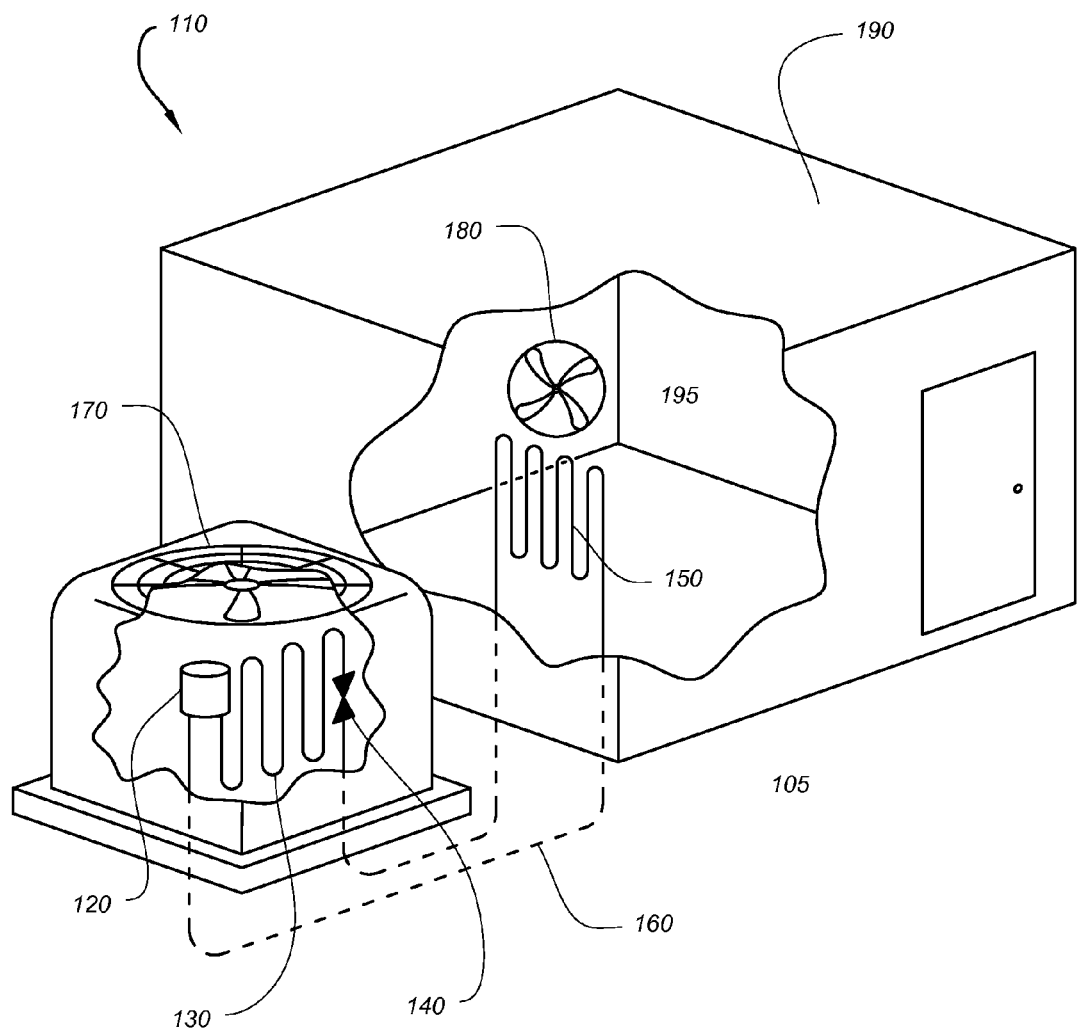
FIG. 1 is an illustration of a building with a common single-stage, single-speed heat pump.

FIG. 1 illustrates a common configuration for a heat pump system that is configured to heat or cool a residential or commercial building. The heat pump system 110 includes at least one compressor 120, outdoor evaporator/condenser 130, expansion valve 140, and indoor evaporator/condenser 150, all of which are in fluid communication via tubing 160 which carries a refrigerant (not shown). Fan 170 and blower 180 are shown to transfer the heating or cooling effect of the evaporator/condensers 130, 150 to either the outdoor ambient environment 105 or to the indoor target space 195 of the building 190. The heat pump system depicted in FIG. 1 is a single-speed, single-stage vapor-compression system.

Cascade Floating Intermediate Temperature Heat Pump

Figure 2:
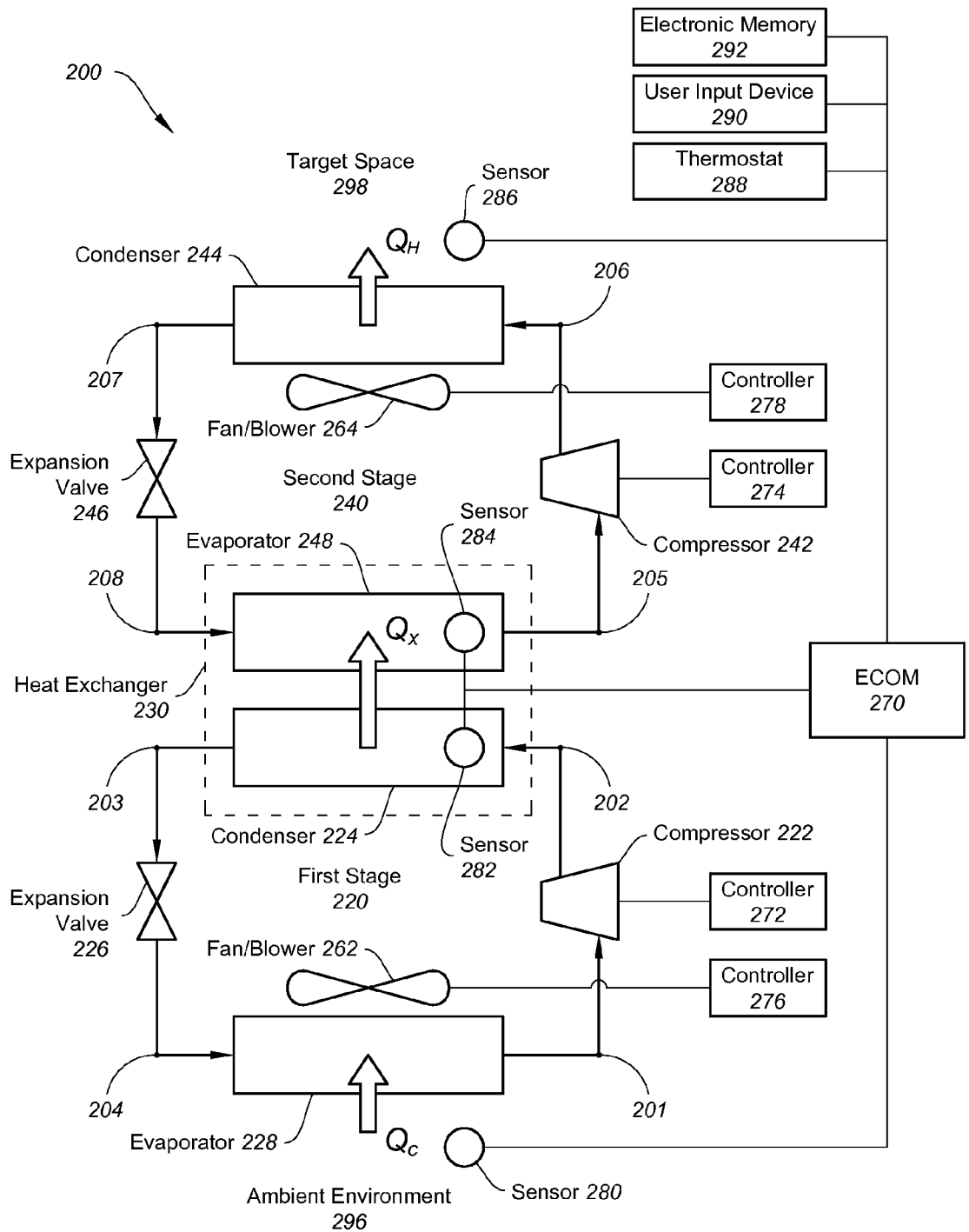
FIG. 2 is a schematic diagram of one embodiment, a variable-speed two-stage cascade floating intermediate temperature heat pump (CFITHP) system.

FIG. 2 is a diagram illustrating one embodiment of a variable-speed, two-stage cascade floating intermediate temperature heat pump (CFITHP) system 200, shown configured to provide heat to a target space 298. The CFITHP system 200 includes two vapor-compression systems, or stages, 220, 240, which are coupled to each other by a cascade heat exchanger 230, wherein the refrigerant in evaporator 248 of the second stage is evaporated using heat supplied from condenser 224 which contains the condensing refrigerant of the first stage 220.

Each stage 220, 240 utilizes a thermodynamic vapor-compression cycle in which a refrigerant travels through a compressor, condenser, expansion valve, and evaporator. The first stage 220 and second stage 240 cycles are identified by points 201-204 and 205-208, respectively. From 201 to 202, the first stage 220 refrigerant is compressed by the compressor 222 elevating the pressure of the first stage 220 refrigerant. From 202 to 203, the first stage 220 refrigerant is then converted from vapor to a saturated or sub-cooled liquid by the condenser 224, thereby releasing heat, $Q_X$, into the second stage 240 evaporator portion 248 of the cascade heat exchanger 230. Between 203 and 204, the first stage 220 refrigerant passes through the expansion valve 226, which reduces the pressure of the first stage 220 refrigerant, thereby cooling the first stage 220 refrigerant. From 204 to 201, the first stage 220 refrigerant travels through the evaporator 228, wherein the first stage 220 refrigerant takes in heat, $Q_C$, from the ambient environment 296, causing the first stage 220 refrigerant to become saturated or slightly superheated vapor.

From 205 to 206, the second stage 240 refrigerant is compressed by the compressor 242 elevating the pressure of the second stage 240 refrigerant. From 206 to 207, the second stage 240 refrigerant is then converted from a vapor to a saturated or sub-cooled liquid by the condenser 244, thereby releasing heat, $Q_H$, into the target space 298. Between 207 and 208, the second stage 240 refrigerant passes through the expansion valve 246, which reduces the pressure of the second stage 240 refrigerant, thereby cooling the second stage 240 refrigerant. From 208 to 205, the second stage 240 refrigerant travels through the evaporator 248, wherein the second stage 240 refrigerant takes in heat, $Q_X$, from the first stage 220 condenser 224 via the cascade heat exchanger 230, causing the second stage 240 refrigerant to become vapor.

The cascade heat exchanger 230 provides efficient heat transfer between the first stage 220 condenser 224 and the second stage 240 evaporator 248. The cascade heat exchanger may be any type of heat exchanger, including, but not limited to, tube-in-tube, shell-and-tube, plate-type, micro-channel or mini-channel, and spiral heat exchangers.

Due to the differences in operating temperatures between the second and first stages, the most efficient solution is often to use different refrigerants in each stage. Specifically, the refrigerant in the second stage 240 should usually have a higher boiling-point than the refrigerant in the first stage 220. The use of the higher boiling point refrigerant in the second stage requires less pressure, often a lower compression ratio, and therefore, less second stage compressor work. For example, the CFITHP system may use R-134a in the second stage and R-410a in the first stage. The boiling point of R-134a is 40° F. higher than the boiling point of R-410a. However, in some embodiments, the CFITHP system uses a higher boiling point refrigerant in the first stage and a lower boiling point refrigerant in the second stage. For example, the CFITHP system may use R-410a in the second stage and R-134a in the first stage. Likewise, in some embodiments, the CFITHP system uses the same refrigerant in both stages. Other refrigerants may be used, including, but not limited to, R-12, R-22, R-290, R-404a, R-407c, R-417a, R-500, R-502, R-600a, R-717, and R-744.

Furthermore, fans or blowers 262, 264 may be utilized to distribute the heating or cooling effect from the condensers 224/244 or evaporators 228/248. Both the terms "fan" and "blower" are used synonymously herein to broadly include any device that causes flow within a gas, usually air.

As shown in FIG. 2, the CFITHP system 200 is configured to pump heat from the ambient environment 296 to a target space 298. However, in some embodiments, the refrigerant flow may be reversed, resulting in the evaporators 228/248 acting as condensers and the condensers 224/244 acting as evaporators. In such a reverse-flow operation, the CFITHP system 200 would pump heat from the target space 298 to the ambient environment 296, cooling the target space 298. Reversal of the refrigerant flow, and hence reversal of the direction of heat transfer, may be achieved using reversing valves known in the art.

As shown in FIG. 2, a single condenser 244 is used to deliver heat to the target space 298. However, in some embodiments, multiple condensers may be used to deliver heat to the target space 298, for example, by delivering heat to multiple air-handlers. Likewise, where the CFITHP system 200 is configured to cool the target space 298, multiple evaporators may be used, for example, by delivering cooling to multiple air-handlers.

Further shown in FIG. 2 is the electronic system control that provides maximized efficiency of the CFITHP system 200. An electronic control module (ECOM) 270 is shown connected to two VFDs 272, 274 that power the compressors 222, 242, respectively, and two VFDs 276, 278 that power the fans/blowers 262, 268, respectively. The ECOM 270 is further connected to sensors 280, 282, 284, 286 which send data to the ECOM that may be used to control the system. For example, sensor 280 may be configured to send the following data to the ECOM: first stage suction pressure; first stage suction temperature; or, ambient environment temperature. Sensors 282 and 284 may be configured to send first stage condenser temperature data and second stage evaporator temperature data, respectively. Similarly, sensor 286 may be configured to send the following data, for example target space (e.g., indoor) temperature, second stage condensing temperature or second stage condensing pressure. The ECOM 270 may also be connected to a thermostat 288. Other data that may be sent to the ECOM by sensors may include compressor speed, fan or blower speed, refrigerant volumetric flow rate, and electrical characteristics (e.g., amperage, voltage, and/or phase angle) of the individual system components such as compressors. The information communicated to the ECOM, as well as the type, number, and location of the sensors and thermostat may vary depending on the arrangement of the system. For example, in one embodiment, the CFITHP system 200 includes a sensor configured to send first stage suction pressure data and a sensor configured to send indoor (i.e. target space) temperature data. In addition to the sensors, in some embodiments, the ECOM may further receive data from a user input device 290 and an electronic memory 292. In some embodiments, the user input device includes a user interface. As discussed further below, using the received data, the ECOM 270 independently and dynamically varies the speeds of the compressors 222, 242 and fans/blowers 262, 264 to achieve maximized system efficiency for a given capacity, measured by COP.

Although the embodiment depicted in FIG. 2 has two stages, some embodiments include cascade heat pump systems with three or more stages. Further, in some embodiments, a known cascade heat pump system configuration is altered by replacing the compressors with variable-speed compressors and further providing an electronic control module that is configured to control the speeds of the variable-speed compressors. As such, some embodiments are not limited to the organization of the cascade system depicted in FIG. 2, but rather are directed to the improvement of known cascade systems—which may vary in composition from the system depicted in FIG. 2—by the addition of variable-speed compressor control as described herein.

Likewise, although the embodiment depicted in FIG. 2 has two variable-speed compressors, in some embodiments, only one stage uses a variable-speed compressor, while the other stage uses a fixed-speed compressor. One having ordinary skill in the art will appreciate that some of the benefits from using two variable-speed compressors can be realized by using one variable-speed compressor with one fixed-speed compressor.

Variable-Speed Compressor Control

In the embodiment depicted in FIG. 2, the compressors 222, 242 are powered by variable-speed drives (VSDs), also known as variable-frequency drives (VFDs). These VFDs are described in U.S. patent application Ser. Nos. 12/510,139 and 12/510,140 which are hereby expressly incorporated by reference in their entirety. VFDs vary the speed of electric motors while maintaining torque and efficiency, by altering the frequency and/or voltage applied to the motor. Use of VFDs to power the compressors 222, 242 provides numerous efficiency benefits when used in a cascade heat pump system.

First, the use of VFDs to power the compressors in a cascade heat pump system allows the system to adjust—i.e., "float"—the intermediate temperature in the cascade heat exchanger to result in the highest overall system COP. For a given target space temperature, and ambient temperature, the overall COP of the system varies with the temperature lift in each cycle, which is dependant on the intermediate temperature in the cascade heat exchanger.

Second, the use of VFDs to power the compressors in a cascade heat pump system further increases the efficiency of the system by optimizing temperature overlap between the condenser 224 of the first stage 220 with the evaporator 248 of the second stage 240 within the cascade heat exchanger 230. The variable speed of each of the compressors 222, 242 allows the CFITHP system 200 to independently adjust the condenser temperature in the first stage 220 and the evaporator temperature of the second stage 240 to optimize overlap. This allows operation at the thermodynamic "sweet spot" of maximized efficiency for each of the vapor-compression stages 220, 240 at a given capacity.

For the cascade heat exchanger 230 to provide an efficient transfer of heat between the first stage 220 condenser 224 and the second stage 240 evaporator 248, some temperature difference, $\Delta T$, between the lower stage condenser and upper stage evaporator is necessary. For the same reason, some $\Delta T$ between the second stage condenser and the target space temperature, as well as between the first stage evaporator and the ambient environment temperature is also necessary. $\Delta T$ is a function of the thermal energy (heat flux) to be moved across the heat exchangers (i.e., condensers or evaporators). At part-load conditions, the heat flux is lower, thereby requiring a lower $\Delta T$. By independently controlling the temperature of the condensers 224, 244 and evaporators 228, 248, the CFITHP system 200 can control $\Delta T$ for each heat exchanger to an ideal value corresponding to maximum overall system efficiency, wherein the temperature overlap is optimized.

Third, using VFDs removes the limitation on the system to be cycled on or off. For example, a heat pump system with VFDs can operate the compressors at a speed corresponding to the heating or cooling load of the environment having its temperature controlled. For example, if the controlled environment requires 5000 watts of heating, the compressor can be operated at a speed corresponding to providing the necessary 5000 watts of heat. This allows for improved energy efficiency in the system because energy inefficiencies experienced with repeatedly starting and stopping the compressor is avoided and heat transfer surfaces will operate with higher efficiencies.

Likewise, the temperature deadband around the setpoint in a controlled environment is dramatically reduced when compared to conventional heat pump systems in which the compressor is either on or off. In conventional heat pump systems, in order to prevent frequent state changes between off and on, the control system works with a deadband characteristic. In such systems, temperature excursions correspond to the deadband. For example, in some systems the deadband of the system is 4° F. If the temperature is set to 72° F., once the temperature of the environment is 72° F., the compressor is turned off. However, because of the 4° F. of deadband, the compressor will not be turned on again until the temperature of the environment is 68° F. In contrast, in a heat pump system with VFDs controlling the compressors, the electronic control system incrementally increases and decreases the speed of the compressor to provide precise control of the temperature in the environment. As a result, there is less or no deadband, and, accordingly, significantly reduced trade-off between consistency of temperature and power consumption.

As an alternative to using VFDs to power the compressors, one of skill in the art will appreciate and understand that embodiments utilizing any other means for variably controlling the speed of the compressors are within the scope of the present disclosure. For example, electronically commutated motors (ECMs), well-known in the art may be used. ECMs are driven by electronic control circuitry, which can provide variable-speed control for the ECM. For example, to provide variable-speed control to an ECM, control circuitry may be used to reduce the voltage supplied to the motor. At the same time, a substantially smooth control voltage, dependent on the variable voltage supplied to the motor, may be applied to control a pulse width modulator, which produces output pulses which also control the flow of energy to the motor.

Other alternatives to using VFDs to provide variable speed control for the compressors include, but are not limited to, direct control. In direct control, the speed of a DC motor is controlled by varying armature voltage or field current.

Fan/Blower Speed Control

In the embodiment depicted in FIG. 2, the CFITHP system 200 also utilizes one or more fans/blowers 262, 264. Compared to compressors, fan and blower power requirements are affected even more dramatically with variable-speed operation rather than fixed speed operation. For a single-speed fan or blower at 50% load the power consumption is approximately 50% based on run time. However, at variable-speed operation, based on the governing fan laws, only 12.5% of the power is required when the air flow rate is 50%. With modern motor technologies, virtually all of this performance improvement can be realized.

Condenser and evaporator performance are also strongly affected by the modulation of thermal load. The effectiveness of each of the heat exchangers increases with decreasing thermal load. This has the effect of raising the evaporator temperature and lowering the condenser temperature, thereby reducing the load on the compressor, and thus its power consumption. As such, as an addition or alternative to varying the compressor speeds, the electronic control system can vary fan/blower speeds which also impact the intermediate temperature in the cascade heat exchanger.

As with the compressors, variable-speed fan or blower operation may be achieved using any means, that provides variable speed control, including, but not limited to VFDs, ECMs, or direct motor control.

The number, arrangement, type, and speed control of fans and/or blowers may vary given the requirements and restrictions for a given system. For example, in some embodiments, the CFITHP system may use only one single-speed outdoor (i.e. ambient environment) fan, and one variable-speed indoor (i.e. target space) blower powered by an ECM. In other embodiments, no variable-speed type fan/blower is used.

Electronic Control System

In one embodiment, the CFITHP system 200 incorporates an electronic control module (ECOM) 270 to control the variable-speed operation of at least one of the compressors 222, 242 and fans/blowers 262, 264. The ECOM may take the form of a circuit board, but may also comprise a general purpose computer, or any other device capable of receiving inputs, analyzing the inputs, and outputting control signals.

Figure 3:
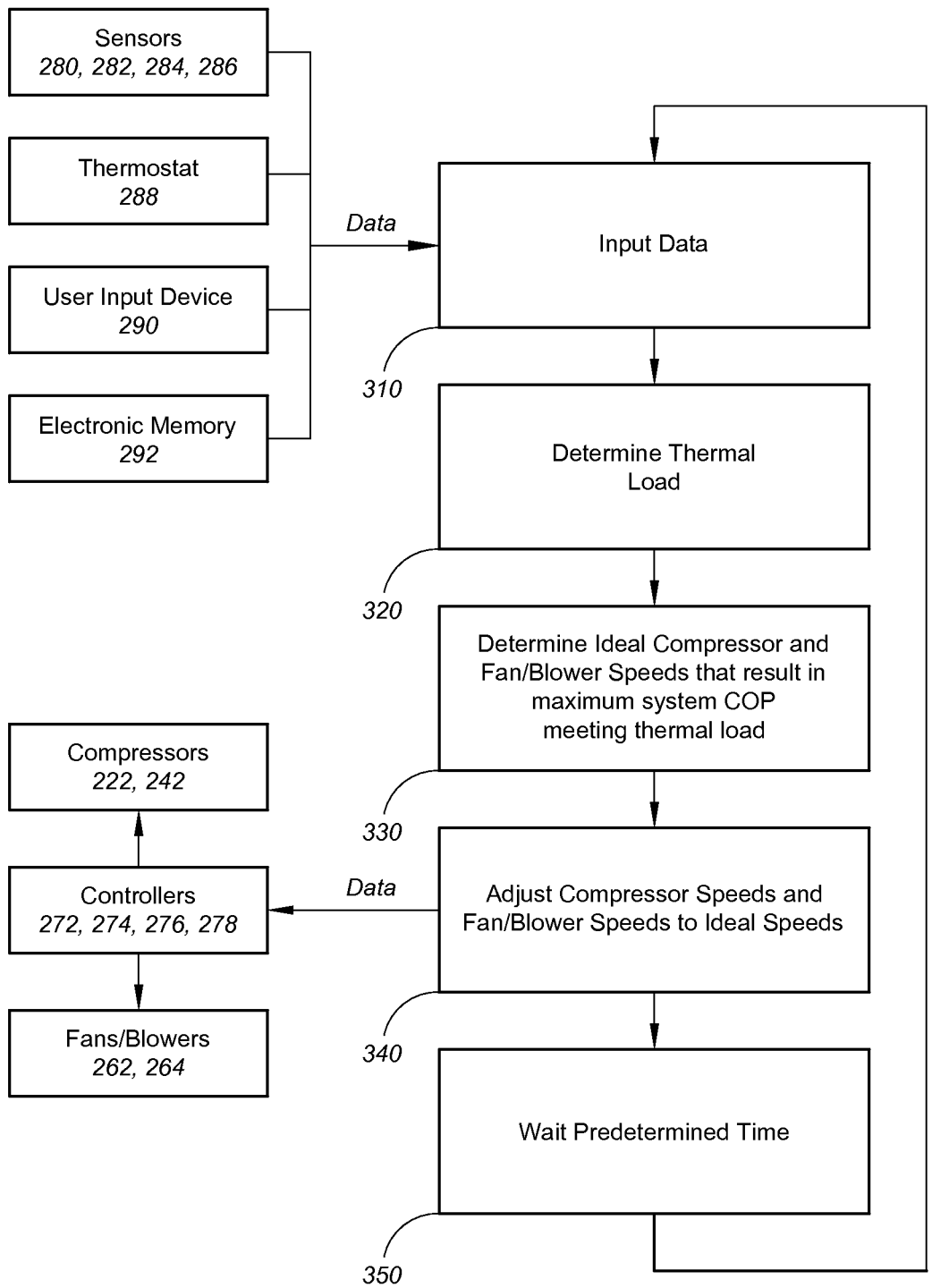
FIG. 3 is a flow chart depicting one embodiment of a control process which dynamically adjusts the speed of the compressors and fans/blowers to achieve maximized overall system efficiency.

FIG. 3 is a flow chart depicting one embodied control process by which the ECOM 270 dynamically varies the speed of one or more of the compressors 222, 242 and fans/blowers 262, 264 to achieve maximized overall system efficiency, measured by COP. First, in step 310, the ECOM inputs the data to be used for control of the system. In some embodiments, these data include, but are not limited to, the target space (e.g. indoor) temperature, the ambient temperature, the temperature in the first stage condenser, the temperature in the second stage evaporator, the electrical characteristics (e.g., amperage, voltage, and/or phase angle) of system components, the compressor speeds, and the fan/blower speeds. In one embodiment, the data used for optimizing heat pump operation include first stage suction pressure and indoor (i.e. target space) temperature. As an alternative to first stage suction pressure, one can provide first stage suction temperature or outdoor (i.e. ambient) temperature. Further, as an alternative to indoor temperature, one can provide second stage condensing temperature or second stage condensing pressure. Other data used for system control may include, for example, the thermophysical properties of the refrigerants used, and the efficiency curves for the compressors and fans/blowers. Some of these data may be inputted from one or more sensors 280, 282, 284, 286 within the system, while others may be inputted from other sources, including but not limited to, for example, from electronic memory 292, a thermostat 288, or a user input device 290.

Next, in step 320 of the control process, the ECOM 270 determines the thermal load of the system. In one embodiment, thermal load is predetermined can be provided by user input or from an electronic memory. In another embodiment, the ECOM uses the current delivered system capacity as the thermal load. In other embodiments, the ECOM determines the thermal load based on the difference between the indoor temperature and a desired temperature. In another embodiment, second stage calls for space conditioning from the thermostat 288 are used to increase capacity until the second stage call is alleviated. In determining the thermal load, the objective is to provide a heat flux that keeps the target space 298 at the desired temperature. The desired temperature may be provided, for example, by a thermostat 288, user input device 290, electronic memory 292, or any other source. In some embodiments, the ECOM monitors the target space temperature over time in order to determine the thermal load. In one embodiment, the indoor temperature is inputted and then a time rate change of indoor temperature is calculated to determine temperature vs. time in order to either increase or decrease heat pump capacity. Delivered capacity directly affects the speed at which the indoor temperature changes. Therefore, the ECOM may set the thermal load to correspond to a target rate of change of indoor temperature. The target rate of change of indoor temperature may be affected by multiple considerations, including, but not limited to, energy efficiency, comfort, noise levels, user input, time of day, and/or sensor input. In one embodiment, the ECOM forecasts the future demand load of the system, for example, by using extrapolation or linear regression given a series of previous indoor temperature data. The ECOM may then determine the thermal load to meet the future demand load instead of the immediate demand load.

Next, in step 330 of the control process, the ECOM 270 determines the ideal compressor speeds and fan/blower speeds that result in the maximum system COP for the thermal load. The ECOM uses an optimization process to determine the most efficient combination of lower cycle and upper cycle temperature lifts—and thus the ideal compressor and fan/blower speeds—for the thermal load. The optimization process takes into account numerous factors affecting efficiency, including but not limited to: compressor capacity and efficiency curves for various suction temperatures/pressures; fan/blower efficiency curves for heat rejection/delivery to the target space; and temperature overlap necessary for efficient heat flux across each heat exchanger. The optimization process determines the most efficient first cycle and second cycle temperature lifts, and the corresponding ideal compressor and fan/blower speeds necessary to achieve those ideal temperature lifts. A person of ordinary skill in the art will understand how to develop such an optimization process, which may be derived, for example, using theory, empirical data, or a combination of the two.

For example, in some embodiments, the optimization process determines the ideal compressor and fan/blower speeds by calculating the system COP at the thermal load for a range of potential temperature lifts, and then selecting the temperature lifts corresponding to the highest overall system COP. Then, the optimization process determines the ideal compressor speeds and fan/blower speeds corresponding to the selected temperature lifts. The ECOM can calculate the COP of the system from the work required by the compressors and fans/blowers to achieve each set of potential temperature lifts. The work required by the compressors and fans/blowers can be determined by compressor and fan/blower efficiency curves. The optimization process also takes into account the necessary temperature overlap for efficient heat flux across each heat exchanger. Although this example describes determining ideal speeds of the compressors and fans/blowers, in some embodiments, only the ideal compressor speeds are determined.

Next, in step 340 of the control process, the ECOM 270 adjusts the compressor speeds and fan/blower speeds in to their ideal speeds in order to reach the maximum system COP meeting thermal load. To achieve this, the ECOM sends data (e.g., a signal) to each controller 272, 274, 276 and 278 to increase, reduce, or maintain speed as necessary to match the ideal speed determined by the optimization process. In some embodiments, the ECOM 270 verifies the system COP has been maximized by measuring actual delivered system capacity and work input, and comparing those values to those determined in the optimization process. In other embodiments, the ECOM verifies that the delivered system capacity meets the thermal load. If the ECOM determines COP has not been maximized or that thermal load has not been met, it can make corrective adjustments. These corrective adjustments may include, for example, increasing or decreasing one or more compressor and/or fan/blower speeds. The ECOM may also adjust the data it uses for the optimization process to reflect actual measured conditions.

After step 340, the ECOM 270 waits a predetermined amount of time before cycling back to the step 310. The predetermined time may include, for example, 0.01 seconds, 0.05 seconds, 0.1 seconds, 0.02 seconds, 0.5 seconds, 1 second, 2 seconds, 5 seconds, 10 seconds, 30 seconds, 1 minute, 2 minutes, 10 minutes, 1 hour, 1 day, or any value lower, higher, or there between the previous values. In other embodiments, the control process is repeated immediately, without waiting a predetermined amount of time. In some embodiments, the control process is repeated upon the occurrence of an even other than the passage of a specific amount time, including, for example, user input, time of day, date, or sensor input.

In some embodiments, the step of determining thermal load and the step of determining ideal system conditions are undertaken at the same time. For example, the thermal load, and corresponding rate of target space temperature change, may be determined as a function of system COP. For example, if a higher thermal load is more efficient at raising target space temperature to the desired temperature, then the thermal load would be set at the higher value to result in increased energy efficiency. Some considerations, such as the maximum system capacity, comfort, minimum temperature rates of change, and noise, for example, may still provide limitations for the thermal load determination in this embodiment.

This methodology for achieving maximum overall system efficiency may be carried out by a human operator; however, the use of the ECOM 270 provides faster, more accurate system adjustment.

Pulsing Refrigerant Flow Control

In one embodiment of the CFITHP system 200, the expansion valves 226, 246 comprise pulsing thermal expansion valves (PTXVs), as described in U.S. Pat. Nos. 5,675,982, 6,843,064, and 5,718,125, which are hereby expressly incorporated by reference in their entirety.

Unlike conventional thermal expansion valves (TXVs), PTXVs pulse to modulate the flow of refrigerant. The use of PTXVs results in various benefits. Conventional TXVs generally modulate refrigerant superheat in a ±7° F. range, whereas PTXVs allow precise modulation of superheat as close as ±0.5° F. As such, PTXVs increase the COP of a heat pump by utilizing the surface area of the evaporator fully. Likewise, a PTXV protects the compressor by eliminating potential flooding that may occur if the refrigerant has not fully evaporated before entering the compressor. The PTXV also has a much faster response to changing flow and pressure conditions. The pulsation effect also increases heat transfer in the evaporator and condenser since the liquid pulsations break up the thermal and hydrodynamic boundaries in these heat exchangers, thereby increasing their effectiveness.

The use of PTXVs is also beneficial because the CFITHP system utilizes varying compressor-speeds, which results in variable refrigerant flows to the condenser and to the evaporator. Conventional TXVs are often too sluggish in their response and may not be able to handle or take advantage of varying refrigerant flows and hunt or flood, thereby reducing evaporator efficiency and system performance. In order to achieve desired advantages of such variable refrigerant flows, according to this embodiment, PTXVs are used to produce a full range of evaporator superheat control at all refrigerant flows without starving or flooding the evaporator. Such refrigerant control is especially important at lower refrigerant flow rates resulting from variable compressor speeds. Conventional expansion devices are designed to operate at full flow and are inefficient at lower flows, and fluctuating flows, again, starving and/or flooding the evaporator. PTXVs are capable of operating over a wide range of capacities, resulting in high turndown ratios, including, but not limited to 1.5:1, 2:1, 3:1, 4:1, 5:1, 6:1, 7:1, 8:1, 9:1 and 10:1. The turndown ratio is defined as the ratio of maximum controlled refrigerant flow to minimum controlled refrigerant flow. The PTXVs may be mechanical valves such as described in U.S. Pat. Nos. 5,675, 982 and 6,843,064, or electrically operated valves of the type described in U.S. Pat. No. 5,718,125. Such valves operate to control refrigerant-flow to the evaporator throughout the variable refrigerant flow ranges from the compressor and condenser.

WORKING EXAMPLE

Example 1

Computer Simulation

In order to investigate the energy efficiency benefits of a system as described above, the software "Cycle_D version 4" made by the National Institute of Standards and Technology was used.

Three cases were investigated: (1) a single-speed, single-stage heat pump using R-410a; (2) a single-speed two-stage cascade heat pump with R-410a in the lower stage and R-134a in the higher stage; and, (3) a variable-speed two-stage CFITHP with R-410a in the lower stage and R-134a in the higher stage. The results are summarized in the table below.

| SYSTEM | Evaporator Temp. (° F.) | Condenser Temp. (° F.) | Heating Capacity (Btu/hr) | Power Consump. (kW) | Heating COP |
|---|---|---|---|---|---|
| Single-Speed Single-Stage (R-410a) | −20 | 110 | 60,200 | 7.3 | 2.6 |
| Single-Speed Two-Stage Cascade (R-410a/R-134a) | −20 | 110 | 60,275 | 6.2 | 2.85 |
| Variable-Speed Two-Stage CFITHP (R-410a/R-134a) | −20 | 110 | 60,650 | 5.5 | 3.2 |

Computer Simulation Results

As shown, given the same evaporator temperature, condenser temperature, and substantially the same heating capacity, the CFITHP system provided the highest $COP_{heating}$ compared to both the single-speed single-stage system and the single-speed two-stage cascade system. The $COP_{heating}$ of 3.2 for the CFITHP system was 12.3% higher than the single-speed two-stage cascade system, and 23% higher than the single-speed single-stage system.

What is claimed is:

1. A heat pump system comprising:
   a first stage having a first compressor, a first condenser, a first expansion valve and a first evaporator;
   a second stage having a second compressor, a second condenser, a second expansion valve and a second evaporator, wherein the first condenser and second evaporator are positioned to pump heat from the first condenser to the second evaporator, and wherein at least one of the first compressor and the second compressor is a variable-speed compressor;
   a plurality of sensors; and
   an electronic control module configured to:
      receive input from the plurality of sensors,
      determine, based at least partly on the input, a thermal load of the system,
      determine, via an optimization process, an intermediate temperature between the first stage and the second stage in order to increase a coefficient of performance of the system at the determined thermal load, and
      control a temperature of one or both of the first condenser and second evaporator to achieve the determined intermediate temperature.

2. The heat pump system of claim 1, wherein the first compressor is a fixed-speed compressor.

3. The heat pump system of claim 1, wherein the other of the first compressor and the second compressor is a variable-speed compressor.

4. The heat pump system of claim 1, wherein the variable-speed compressor is powered by a variable-frequency drive.

5. The heat pump system of claim 1, wherein the variable-speed compressor is powered by an electrically commutated motor.

6. The heat pump system of claim 1, wherein the first expansion valve and the second expansion valve are pulsing thermal expansion valves.

7. The heat pump system of claim 1, further comprising at least one variable-speed fan or blower.

8. The heat pump system of claim 1, wherein the plurality of sensors comprise a plurality of temperature sensors configured to send temperature data to the electronic control module.

9. The heat pump system of claim 1, wherein the plurality of sensors comprise a pressure sensor configured to send suction pressure data from the first stage to the electronic control module.

10. The heat pump system of claim 1, further comprising a first refrigerant in the first stage and a second refrigerant in the second stage.

11. The heat pump system of claim 10, wherein the first refrigerant is different from the second refrigerant.

12. The heat pump system of claim 1, further comprising a third stage having a third compressor, a third condenser, a third expansion valve and a third evaporator and configured to pump heat from the second condenser to the third evaporator.

13. A method of controlling a cascade heat pump system, comprising:
   providing a first heat pump stage having a first compressor, a first condenser and a first evaporator;
   providing a second heat pump stage having a second compressor, a second condenser and a second evaporator, wherein the first evaporator and second condenser are positioned to pump heat from the first condenser to the second evaporator, and wherein at least one of the first compressor and the second compressor is a variable-speed compressors;
   providing a plurality of sensors;
   receiving input from the plurality of sensors;
   determining, based at least partly on the input, a thermal load of the system;
   dynamically varying, based at least partly on performing an optimization process, an intermediate temperature between the first heat pump stage and the second heat pump stage to maximize a coefficient of performance of the system at the determined thermal load.

14. The method of claim 13, wherein either the first compressor or the second compressor is a fixed-speed compressor.

15. The method of claim 13, wherein the other of the first compressor and the second compressor is a variable-speed compressor.

16. The method of claim 13, wherein determining the thermal load comprises receiving data representing an ambient environment temperature and a target space temperature from at least one sensor of the plurality of sensors.

17. The method of claim 13, wherein receiving input from the plurality of sensors comprises receiving one or both of pressure sensor data and temperature sensor data.

18. The method of claim 13, wherein the speed of the variable-speed compressor is controlled by controlling power to a variable frequency drive.

19. The method of claim 13, wherein the speed of variable-speed compressor is controlled by controlling power to an electronically commutated motor.

20. The method of claim 13, further comprising controlling the speed of a fan configured to blow air over the first evaporator.

21. The method of claim 13, further comprising controlling the speed of a fan configured to blow air over the second evaporator.

22. The method of claim 13, further comprising providing a pulsing thermal expansion valve between the first condenser and the first evaporator.

23. The method of claim 22, further comprising providing a pulsing thermal expansion valve between the second condenser and the second evaporator.

24. The heat pump system of claim 1, wherein the input comprises an ambient environment temperature and a target space temperature.

25. The heat pump system of claim 24, wherein the electronic control module is further configured to determine at least one ideal temperature lift comprising one or both of a first temperature differential between the second condenser and the target space temperature and a second temperature differential between the first evaporator and the ambient environment temperature.

26. The heat pump system of claim 25, wherein the electronic control module is further configured to control a temperature of one or both of the second condenser and the first evaporator to achieve the at least one ideal temperature lift.

27. The heat pump system of claim 1, wherein to determine the intermediate temperature the electronic control module is configured to perform the optimization process to determine the intermediate temperature corresponding to a highest coefficient of performance of the system at the determined thermal load.

* * * * *